Aug. 23, 1966 ATSUO ICHIKAWA 3,268,799

APPARATUS FOR SLOWLY CONVERTING THE SIGNAL OUTPUT IN A MULTI-STAGE PRESET CIRCUIT

Filed Sept. 24, 1963 2 Sheets-Sheet 1

Atsuo Ichikawa
INVENTOR.

BY George B. Oujevolk
Attorney

Atsuo Ichikawa
INVENTOR.
BY
Attorney

United States Patent Office 3,268,799

Patented August 23, 1966

3,268,799

APPARATUS FOR SLOWLY CONVERTING THE SIGNAL OUTPUT IN A MULTI-STAGE PRESET CIRCUIT

Atsuo Ichikawa, Yokohama-shi, Japan, assignor to Tokyo Shibaura Electric Co., Ltd., Kawasaki-shi, Japan, a corporation of Japan Filed Sept. 24, 1963, Ser. No. 311,191
3 Claims. (Cl. 323—94)

This invention relates to an apparatus for slowly converting the signal output level in a multi-stage signal output preset power-supply circuit.

It is well known that it is sometimes dangerous to apply a full voltage drop to a load, e.g., motor field winding and that power is best applied gradually. Prior art types of such slow signal output conversion apparatus have not presented a smooth variation of the output voltage during its slow conversion.

Therefore it is the object of the present invention to provide a smooth and certain variation of such output voltage.

According to this invention, there is provided a multi-stage signal output preset circuit comprising a parallel connection of a plurality of series-circuits each formed by a variable resistor and a rectifier and having one end connected to a bus line and the other end connected to the output terminal. According to this invention, there are provided connection units for voltage transformation comprising two series-circuits each formed by a conductive element and a slide type voltage adjusting element and arranged in parallel relationship with the slide type adjusting elements at opposite ends thereof, i.e., they are arranged side by side but in a reverse relation to each other. The connection units are provided with sliders movable simultaneously in the same direction along each unit and the output of each slider is applied by a set of selecting switches to each bus line mentioned above through a short-circuit preventing means.

The invention will now be described with reference to the accompanying drawings, in which.

Figure 1:
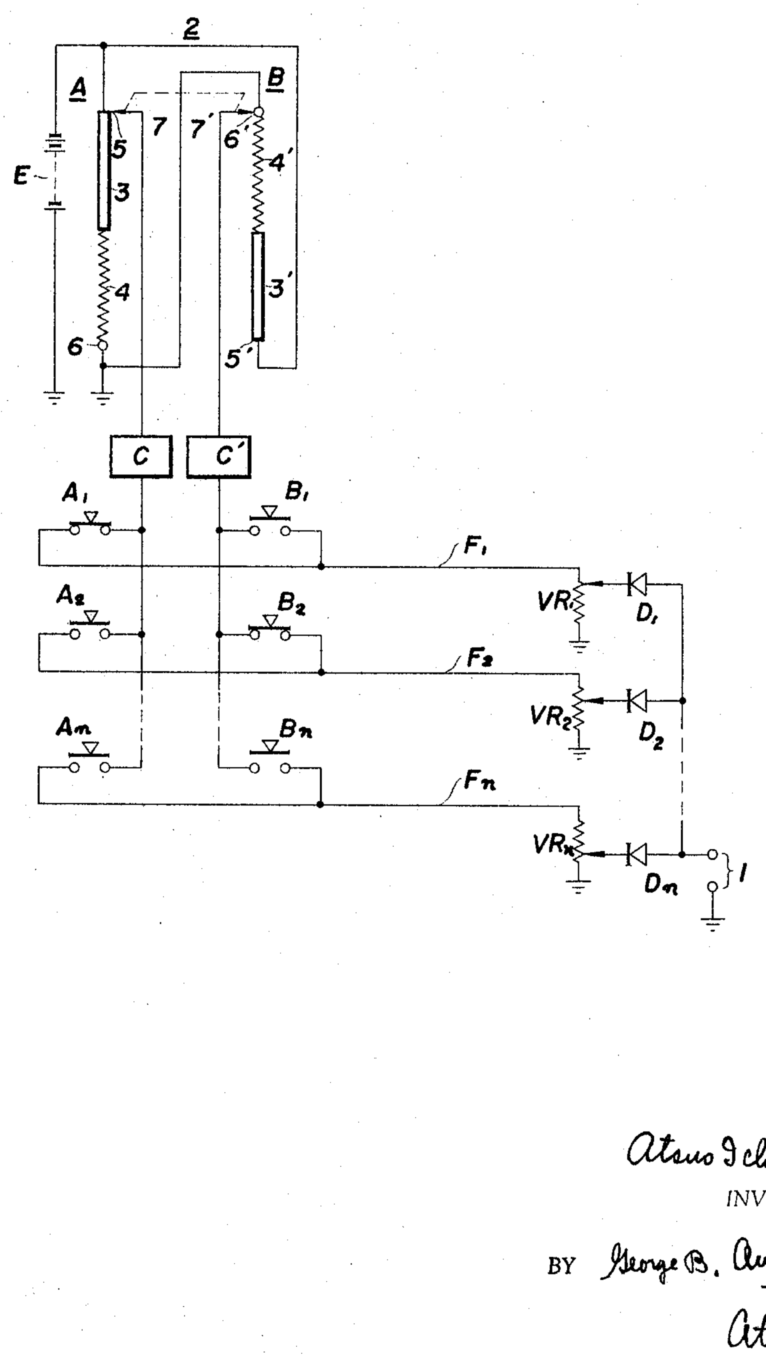
FIG. 1 shows the circuit diagram of an embodiment of this invention for use with a D.C. power source.

Referring now to FIG. 1, there are shown variable resistors $VR_1$, $VR_2$ . . . $VR_n$ and rectifiers $D_1$, $D_2$ . . . $D_n$ forming variable resistor-rectifier series circuits ($VR_1D_1$), ($VR_2D_2$) . . . ($VR_nD_n$) arranged in parallel relation, with one end connected to the signal output terminal 1 and the other ends connected by lines $F_1$, $F_2$ . . . $F_n$ to the slow conversion device 2 through a set of selecting switches. The slow conversion device 2 comprises a series-connection unit A formed by conductive element 3 and slide resistor 4 and another series-connection unit B formed by conductive element 3' and slide resistor 4', these two units being arranged side by side so that slide resistor 4 is disposed alongside conductive element 3' and slide resistor 4' is alongside conductive element 3. The outer ends 5 and 5' of the conductive elements are connected to receive the negative potential of the D.C. source E and the outer ends 6 and 6' of the resistors are connected to receive the positive potential of the same source E. Each unit is provided with sliders 7, 7' arranged to be moved simultaneously in the same direction along each unit A, B. The output end of each slider 7, 7' is connected through short-circuit preventing means C, C' to the selecting switches $A_1$, $A_2$ . . . $A_n$, $B_1$, $B_2$ . . . $B_n$, respectively. When used with a D.C. source, the short-circuit preventing means may be rectifiers, for example. The power supplies from units A and B are thus independent of each other and therefore, system B may be at the ground potential while system A is at an elevated potential, so that if the switches for system B are operated when the switches for system A are in operation, it will not affect the signal output.

Figure 2:
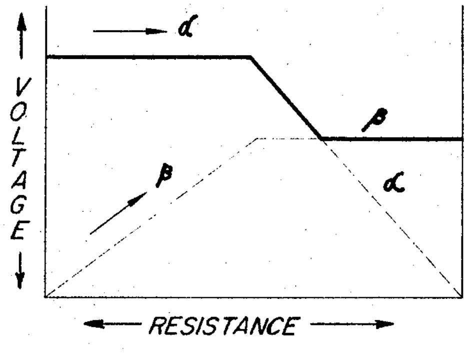
FIG. 2 shows a graph describing the slow conversion operation of the signal output.

When switch $A_1$, alone is closed, a voltage determined by the variable resistor $VR_1$ is applied to the output terminal 1, and when switch $A_1$ is opened and switch $A_2$ closed, the signal output will be quickly turned over to the voltage determined by the variable resistor $VR_2$. Now where it is desired to slowly transfer from the signal level determined by $VR_1$ to that determined by $VR_2$, switch $B_2$ is closed while switch $A_1$ stays closed and then the sliders 7 and 7' are moved together from the positions shown at 5 and 6' to the positions shown at 6 and 5'. As shown in FIG. 2, this causes the voltage across $VR_1$ to vary as $\alpha$ and the voltage across $VR_2$ to vary as $\beta$, causing the resultant signal output to vary from the output voltage determined by $VR_1$ to that determined by $VR_2$ through a slow development on the way, as shown by the solid line.

Figure 3:
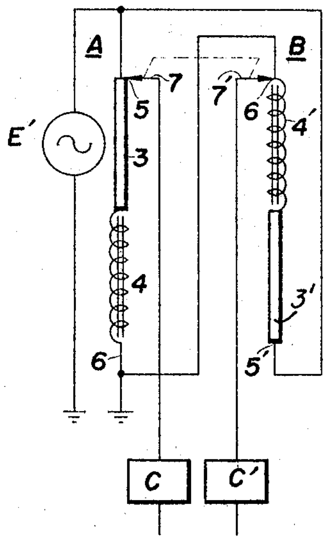
FIG. 3 shows a circuit diagram of another embodiment of this invention for use with an A.C. source, showing the slow conversion device thereof alone.

FIG. 3 shows another example of the slow conversion device 2 for use with an A.C. source. In this case, use is made of two series units A and B comprising conductive element 3 and slide winding 4 and conductive element 3' and slide winding 4', respectively, with sliders 7 and 7' connected to a set of selecting switches through their respective short-circuit preventing means C and C' which may comprise separate type transformers and rectifiers, for example. In the same way as in FIG. 1, the ends 5 and 5' of the conductive elements and the ends 6 and 6' of the slide windings are connected to the terminals of source E' so as to have the same potentials.

It will be apparent that the present invention affords a smooth slow conversion of the output signal in a multi-stage signal output preset apparatus.

It will be apparent that the embodiment shown is only exemplary and that various modifications will be possible in arrangement within the scope of this invention as defined in the appended claims.

What is claimed is:

1. A slow signal output conversion apparatus for a multi-stage preset circuit comprising a plurality of series-circuits arranged in parallel relation, each consisting of a variable resistor and a rectifier, and having one end connected to a bus line and the other end connected to a single output terminal, first and second connection units for voltage transformation including in each connection unit, a conductive element with inner and outer ends, connected at its inner end to a variable slide wiper-type resistance means, said units being disposed side by side in parallel but, the variable resistance means in the first unit being alongside the conductive element in the second unit, the variable resistance means in the second unit being alongside the conductive element in the first unit, connecting leads from said conductive element outer ends for connection to a power source, first and second slide wipers, mechanically connected for movement together along said first and second connection units including output ends providing an output from the power source across said connection units, short circuit prevention means in series with said slide wipers output ends and, selection switches for connecting said slide wiper output ends to said bus lines.

2. An apparatus as claimed in claim 1, said resistance means being variable resistors.

3. An apparatus as claimed in claim 1, said resistance means being windings.

References Cited by the Examiner

UNITED STATES PATENTS

| | | | |
|---|---|---|---|
| 2,830,453 | 4/1958 | Jones | 338—129 X |
| 2,959,729 | 11/1960 | Karg | 338—130 X |

JOHN F. COUCH, *Primary Examiner.*

LLOYD McCOLLUM, *Examiner.*

A. D. PELLINEN, *Assistant Examiner.*